UNITED STATES PATENT OFFICE.

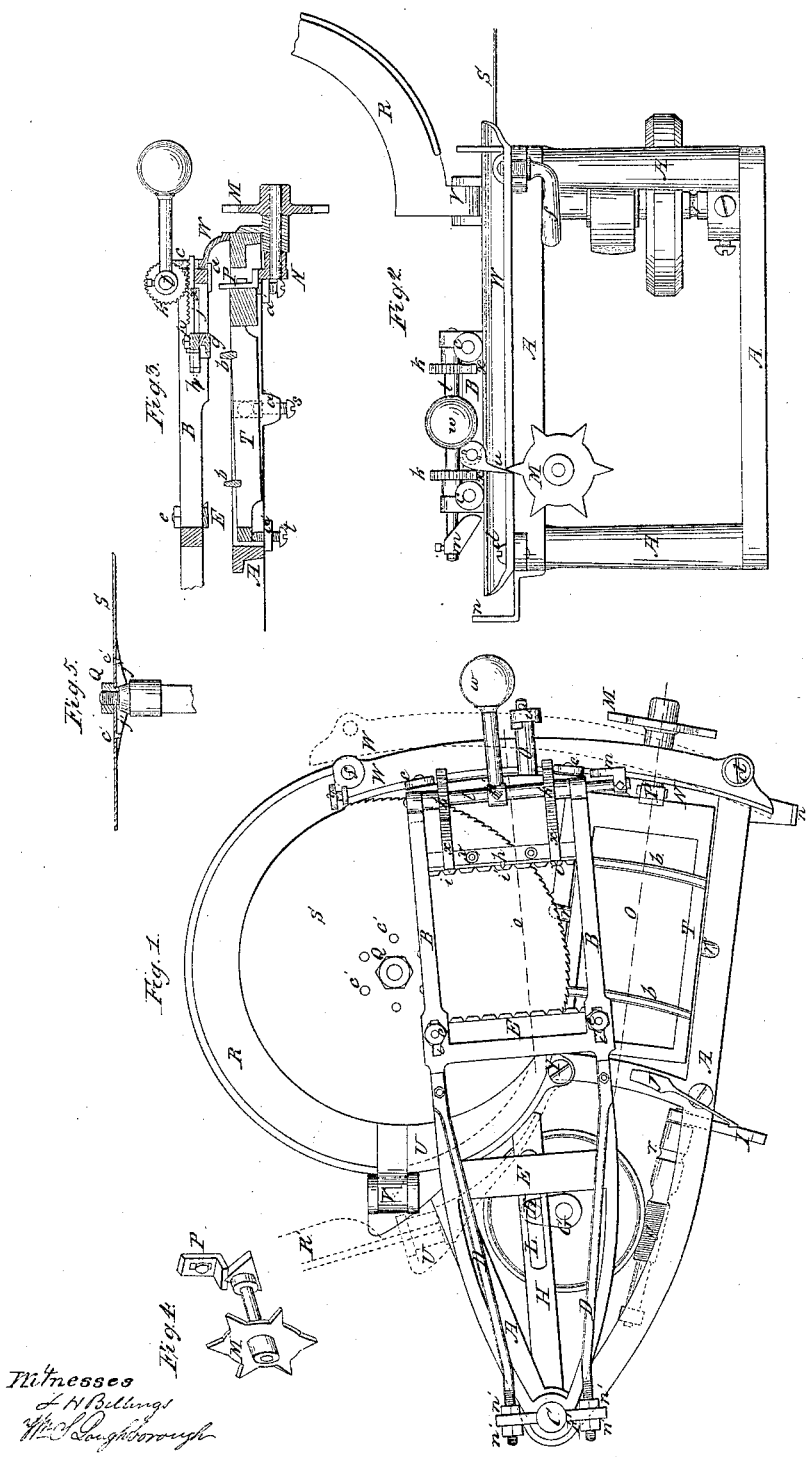

JOHN B. DOUGHERTY, OF ROCHESTER, NEW YORK.

IMPROVEMENT IN SHINGLE-MACHINES.

Specification forming part of Letters Patent No. 58,618, dated October 9, 1866.

*To all whom it may concern:*

Be it known that I, JOHN B. DOUGHERTY, of Rochester, in the county of Monroe and State of New York, have invented certain new and useful Improvements in Shingle-Machines; and I do hereby declare that the following is a full, clear, and exact description thereof, reference being had to the accompanying drawings, making part of this specification, in which—

Figure 1 is a top view of my invention. Fig. 2 is an elevation of the right-hand end of the same, showing the guard R thrown up, as when the saw is to be removed. Fig. 3 is a vertical longitudinal section of the clamping-frame B and the tilting rest T, taken in the direction of the red lines $o$ in Fig. 1. Fig. 4 is a detached perspective view of the tilting device. Fig. 5 is a vertical section of the saw S and of the collar $j'$, and showing the manner of connecting the same to the mandrel.

Similar letters indicate corresponding parts in all the figures.

This invention consists mainly in providing an automatic clamping device and tilting frame in this class of shingle machines, and also in an automatic feed-motion to the bolt or clamping frame, which causes it to feed forward to the saw at a moderate speed, and return it, after the shingle is sawed from the bolt, much more rapidly.

To enable others to make and use my invention, I will describe its construction and operation.

I construct the frame A similar to that shown in my former patent of March 10, 1863, and the bolt-frame B is similarly pivoted to it by the axial shaft C, which in this case is extended above the frame, and two diagonal braces, D, run from the top to said bolt-frame B, near the fixed clamping-bar E. These brace-rods stiffen the frame and prevent it from trembling or springing in the center. They may be connected to the top of the shaft C by passing through the arms of the yoke or bar F, as seen in Fig. 1, and provided with set-nuts $n'$, whereby they may be shortened up or lengthened, as may be desired.

The right-hand end of the frame is provided with a lug, $a$, Fig. 3, at each corner, that bear against the under side of the circular track W, and the two traverse-rollers $c$ travel upon the upper side of the track, and that being held to the frame by the pivot-screw $d$ and clamping-screw $f$, this end of the frame is prevented from trembling while in action.

The clamping-bar E is made adjustable by means of the set-screws $e$ in the slots $i$, Fig. 1.

The ends of the stock $h$, to which the clamping-bar $g'$ is attached are supported in the slots $j$, Fig. 3. This stock has two toothed racks, $x$, which gear into the pinions $k$ upon the weighted or counterbalanced shaft $l$, to the end of which is attached an inclined plane or cam, $m$, Figs. 1 and 2. When the frame recedes after cutting a shingle, the cam rides upon the tappet or lug $n$, which causes the weight $w$ to rise and turn the pinions $k$, and thus withdraw the clamp, and the bolt drops onto the tilting frame, which is reversed from its previous position, and as the frame B returns to the saw the bolt is again clamped before it reaches the saw.

To adjust the clamps for longer or shorter bolts, the set-screws $e$ are loosened, and the clamp E placed forward or back, and the set-screws $p$ loosened in the arm of the counterbalance $w$, and in the cam $m$, the pinion-shaft $l$ turned so as to change the clamp $g$ as desired, and the cam relatively, and the screws again tightened.

The frame B is oscillated by the crank G, working in the slotted arm or lever H, which is keyed to the vertical axial shaft C of the frame B.

The worm or screw gear $g'$ is driven by a round band from the saw-mandrel at $r$, Fig. 2. One end of the screw-shaft $g'$ is supported in the hand-lever I, and is held in gear, when desired, by the spring-latch J. The crank-pin K moves in that portion of the slot L nearest the axial shaft C of the frame B when the latter is moving back after a shingle is sawed, which produces a faster movement than when it is feeding the bolt to the saw, because the pin is then traveling in the outer portion of the slot L.

The tilting frame or rest T in this machine is cast with a trunnion, $r'$, on each side, that rests upon the set-screws $s$, Fig. 3, by means of which it may be set to saw thick or thin shingles; and under each corner of the frame is provided a set-screw, $t$, by means of which the proper bevel is given to the shingle either way while in operation, or upon which the frame rests when the machine is set to saw barrel-heading.

The star dial-plate M, having six points, is hung to the top of the frame A, and on the opposite end from M is provided another, N, having three points, or half the number of the other, whether it be given greater or less. The tilting frame T is provided with an adjustable lug, P, Figs. 1, 2, and 4. It is made adjustable vertically, as seen in Fig. 4. The lower face of the lug is made with a slight V-shaped notch to receive the points of the star N. The arm O, projecting from the clamping-frame, is provided with a latch, $u$, that swings loosely one way, but is prevented from turning in the opposite direction more than to a perpendicular by a lug or projection on the head, striking against a shoulder or pin in the shaft, so that when the clamping-frame is feeding up to the saw the latch is drawn over the point of the star, as indicated in Fig. 2, but when it returns, the star is turned one point from the position shown in Fig. 2, which allows this end of the tilting frame to drop, so as to form the butt or thick end of the shingle at this end of the bolt. This end of the tilting frame, being made considerably heavier than the other, will always rest upon the star N.

The natural tendency is for the saw to drive the end of the bolt laterally away from it, especially when the bolt is narrow. Therefore I provide several flat teeth, $i'$, on the clamping-bar $h$, that stand vertically, and they prevent any such recession or change in the position of the bolt.

The saw-guard is composed of two circular segments, R and U. They are hinged together at V, the axial pivot being horizontal. Section U is pivoted to the frame at Y, and has a plate extending below the saw. It is thereby made to gather the sawdust and convey it, by the centrifugal momentum given it by the saw, to a considerable distance from the machine, and, of course, prevents it from flying all over it and the operator, as heretofore.

Section R is locked to section W, as shown at $y$, Fig. 1, which permits that end to be raised up when the saw is to be removed, as seen in Fig. 2, and at the same time allows the spout-section U to be swung back, as indicated by the dotted lines U′, and section W, being released by turning the clamping-screw $f$, may also be swung back, as shown by the dotted lines W′. The clamping or bolt frame B is then drawn back, which leaves the saw entirely uncovered, when it may be removed by simply taking off the one nut Q.

I provide the saw on the under side with a sort of stock or collar, $j'$, the outer edge of which is made very thin, and it is riveted to the saw, as seen at $c'$ in Figs. 1 and 5. The collar is made with a conical hole, and feathered to receive the end of the mandrel or arbor, to which it is fitted, and it is rigidly riveted to the saw.

By this construction and arrangement of the parts, it is unnecessary to use the stock-collar on the top of the mandrel, as heretofore made, and to which the saw was then secured by three or more bolts. Therefore, with a given-sized saw, much larger bolts may be cut.

The latch $u$ may be turned up or swung over, so as not to come in contact with the points of the star. By this provision the machine may be converted into a barrel-head cutter.

This adjustment of the latch is also frequently required to enable the operator to true up the face of the bolt preparatory to cutting a perfect shingle.

By simply removing the set-screw that attaches the arm H to the shaft C, the machine is converted into a hand-machine.

The rests $b$ of the tilting frame are made in arcs of circles, the centers of which are at the center of shaft C. This prevents the friction heretofore produced by the bolts dragging on across them instead of sliding upon them longitudinally.

It is much cheaper and quite as convenient to provide the frame A with the lugs $a'$, instead of bolting on straps for this purpose, as heretofore practiced.

What I claim as my invention, and desire to secure by Letters Patent, is—

1. The construction and relative arrangement of the saw-guard R and U in the manner shown and described, to facilitate the removal or readjustment of the saw in the machine, and for conducting the sawdust from the machine, substantially as set forth.

2. The arrangement of the counter-balance $w$, shaft $l$, pinions $k$, racks $x$, and clamping-bar $g$, in combination with the cams $m$ and $n$, substantially in the manner and for the purposes set forth.

3. The arrangement of the screw-gears and crank G with the slotted arm H, attached to the axial shaft C of the bolt or clamping frame B, substantially as and for the purposes shown and described.

4. Providing the saw S in the within-described machine with a collar, $j'$, having a conical bore to fit the mandrel, as and for the purposes set forth.

5. The arrangement of the pivoted or swinging circular track W, as and for the purposes set forth.

JOHN B. DOUGHERTY.

Witnesses:
 A. H. BILLINGS,
 WM. S. LOUGHBOROUGH.